US008433995B1

(12) United States Patent
Karam

(10) Patent No.: US 8,433,995 B1
(45) Date of Patent: Apr. 30, 2013

(54) MANAGING BOOKMARKS FOR WEB PAGES

(75) Inventor: Joseph F. Karam, Mountain View, CA (US)

(73) Assignee: Google Inc., Mountain View, CA (US)

( * ) Notice: Subject to any disclaimer, the term of this patent is extended or adjusted under 35 U.S.C. 154(b) by 826 days.

(21) Appl. No.: 11/739,478

(22) Filed: Apr. 24, 2007

(51) Int. Cl.
*G06F 17/00* (2006.01)
*G06F 17/40* (2006.01)

(52) U.S. Cl.
USPC ........... 715/206; 715/207; 715/208; 715/234; 715/738; 715/739

(58) Field of Classification Search .................. 715/843, 715/206–208, 234, 738–739
See application file for complete search history.

(56) References Cited

U.S. PATENT DOCUMENTS

| | | | | | |
|---|---|---|---|---|---|
| 5,805,235 | A | * | 9/1998 | Bedard | 725/38 |
| 5,917,491 | A | * | 6/1999 | Bauersfeld | 715/810 |
| 5,963,964 | A | * | 10/1999 | Nielsen | 715/255 |
| 6,037,934 | A | * | 3/2000 | Himmel et al. | 715/760 |
| 6,049,812 | A | * | 4/2000 | Bertram et al. | 715/205 |
| 6,182,113 | B1 | * | 1/2001 | Narayanaswami | 709/203 |
| 6,182,133 | B1 | * | 1/2001 | Horvitz | 709/223 |
| 6,184,886 | B1 | * | 2/2001 | Bates et al. | 715/760 |
| 6,208,995 | B1 | * | 3/2001 | Himmel et al. | 1/1 |
| 6,209,027 | B1 | * | 3/2001 | Gibson | 709/218 |
| 6,212,522 | B1 | * | 4/2001 | Himmel et al. | 1/1 |
| 6,219,679 | B1 | * | 4/2001 | Brisebois et al. | 715/206 |
| 6,256,639 | B1 | * | 7/2001 | Himmel et al. | 709/203 |
| 6,314,423 | B1 | * | 11/2001 | Himmel et al. | 1/1 |
| 6,314,439 | B1 | * | 11/2001 | Bates et al. | 715/209 |
| 6,460,038 | B1 | * | 10/2002 | Khan et al. | 1/1 |
| 6,480,852 | B1 | * | 11/2002 | Himmel et al. | 1/1 |
| 6,526,424 | B2 | * | 2/2003 | Kanno et al. | 715/229 |
| 6,546,393 | B1 | * | 4/2003 | Khan | 1/1 |
| 6,549,217 | B1 | * | 4/2003 | De Greef et al. | 715/745 |
| 6,557,015 | B1 | * | 4/2003 | Bates et al. | 715/229 |
| 6,574,625 | B1 | * | 6/2003 | Bates et al. | 707/749 |
| 6,804,704 | B1 | * | 10/2004 | Bates et al. | 709/217 |
| 6,832,350 | B1 | * | 12/2004 | Bates et al. | 715/206 |
| 6,834,372 | B1 | * | 12/2004 | Becker et al. | 715/234 |
| 6,848,075 | B1 | * | 1/2005 | Becker et al. | 715/205 |
| 6,948,118 | B2 | * | 9/2005 | Genty et al. | 715/207 |
| 6,970,867 | B1 | * | 11/2005 | Hsu et al. | 1/1 |
| 6,993,531 | B1 | * | 1/2006 | Naas | 1/1 |
| 7,031,961 | B2 | * | 4/2006 | Pitkow et al. | 1/1 |
| 7,165,220 | B1 | * | 1/2007 | Bates et al. | 715/738 |
| 7,167,901 | B1 | * | 1/2007 | Beadle et al. | 709/207 |
| 7,251,775 | B1 | * | 7/2007 | Astala et al. | 715/205 |
| 7,284,232 | B1 | * | 10/2007 | Bates et al. | 717/100 |
| 7,289,812 | B1 | * | 10/2007 | Roberts et al. | 455/456.1 |
| 7,324,997 | B2 | * | 1/2008 | Yamada | 1/1 |
| 7,406,656 | B2 | * | 7/2008 | Schroeder | 715/205 |
| 7,409,441 | B2 | * | 8/2008 | Kake et al. | 709/223 |
| 7,496,830 | B2 | * | 2/2009 | Rubin et al. | 715/206 |
| 7,523,096 | B2 | * | 4/2009 | Badros et al. | 705/7.29 |
| 7,568,150 | B2 | * | 7/2009 | Gupta | 715/207 |

(Continued)

*Primary Examiner* — Steven B Theriault
(74) *Attorney, Agent, or Firm* — McDermott Will & Emery LLP

(57) ABSTRACT

Methods and apparatus, including computer program products, implementing and using techniques for managing bookmarks associated with web pages. A button is displayed on a graphical user interface associated with a browser displaying a web page on the computer display. A user input selecting the button is received. Each time the button is selected, an editing window is displayed, which includes several bookmark editing operations for the displayed web page. The bookmark editing operations can be completed by a user in the editing window.

33 Claims, 7 Drawing Sheets

U.S. PATENT DOCUMENTS

| | | | |
|---|---|---|---|
| 7,636,886 B2 * | 12/2009 | Wyle et al. | 715/277 |
| 7,793,227 B2 * | 9/2010 | Wada et al. | 715/779 |
| 7,956,869 B1 * | 6/2011 | Gilra | 345/592 |
| 7,975,238 B2 * | 7/2011 | Keohane et al. | 715/812 |
| 8,010,523 B2 * | 8/2011 | Djabarov | 707/721 |
| 2001/0011285 A1 * | 8/2001 | Kanno et al. | 707/512 |
| 2002/0075408 A1 * | 6/2002 | Curreri | 348/569 |
| 2002/0078102 A1 * | 6/2002 | Dutta | 707/526 |
| 2002/0083093 A1 * | 6/2002 | Goodisman et al. | 707/511 |
| 2002/0184095 A1 * | 12/2002 | Scullard et al. | 705/14 |
| 2003/0009521 A1 * | 1/2003 | Cragun | 709/205 |
| 2003/0030679 A1 * | 2/2003 | Jain | 345/854 |
| 2003/0101175 A1 * | 5/2003 | Gupta | 707/5 |
| 2004/0093562 A1 * | 5/2004 | Diorio et al. | 715/513 |
| 2004/0187074 A1 * | 9/2004 | Keohane et al. | 715/501.1 |
| 2004/0205499 A1 * | 10/2004 | Gupta | 715/501.1 |
| 2004/0205501 A1 * | 10/2004 | Gupta | 715/501.1 |
| 2005/0039144 A1 * | 2/2005 | Wada et al. | 715/840 |
| 2005/0216457 A1 * | 9/2005 | Walther et al. | 707/4 |
| 2005/0234891 A1 * | 10/2005 | Walther et al. | 707/3 |
| 2005/0256867 A1 * | 11/2005 | Walther et al. | 707/5 |
| 2005/0273718 A1 * | 12/2005 | Naas | 715/745 |
| 2006/0101341 A1 * | 5/2006 | Kelly et al. | 715/738 |
| 2007/0156636 A1 * | 7/2007 | Norton et al. | 707/1 |
| 2008/0195969 A1 * | 8/2008 | Brown et al. | 715/802 |

* cited by examiner

MANAGING BOOKMARKS FOR WEB PAGES

BACKGROUND

This invention relates to the field of information searching and browsing. Computer users are increasingly finding navigating document collections to be difficult because of the increasing size of such collections. For example, the World Wide Web on the Internet includes billions of individual pages. Moreover, large companies' internal Intranets often include repositories filled with large numbers of documents.

Finding desired information in such large collections, unless the identity, location, or characteristics of a specific document are well known, can be difficult. Generally speaking, each document has an address, or Uniform Resource Locator (URL), in the form "http://www.server.net/directory/file.html". In this notation, the "http:" specifies the protocol by which the document is to be delivered, in this case the "HyperText Transport Protocol." The "www.server.net" specifies the name of a computer, or server, on which the document resides; "directory" refers to a directory or folder on the server in which the document resides; and "file.html" specifies the name of the file.

Obviously, a user cannot be expected to remember a URL for each and every document on the Internet, or even those documents in a smaller collection of preferred documents. Accordingly, navigation assistance is not only helpful, but necessary. Modern Web browsers (software applications used to view and navigate documents on the Web) have introduced the concept of "bookmarks" or "favorites" (collectively referred to as "bookmarks" in this document). Bookmarks allow a user to identify which documents the user would like to keep track of, and to reload and view the sites' contents at any desired time without having to remember the specific URLs.

The bookmarks can be stored locally on the user's computer or on a remote server where the bookmarks can be accessed through a network, such as the Internet or an Intranet. Storing the bookmarks on a remote server offers the advantages that a user can access her bookmarks from any computer having the necessary hardware and software to access the remote server, and that several users can use the same computer and still have access only to their own personal list of bookmarks.

Current versions of web browsers store and maintain a user's bookmarks on the user's local computer. Typically, the web browsers only permit limited manipulation of a user's collection of bookmarks. For example, a user can create and modify a hierarchy of bookmarks, modify titles paired with the URLs, search for words within the titles or URLs, and often derive some additional information about the bookmarks, such as the date and time of the user's most-recent visit to the site, the collected number of visits, and possibly other information.

Various companies, such as Google Inc. of Mountain View, Calif., provide toolbars that can be installed in various browsers to provide additional functionality. For example, current implementations of the Google Toolbar have a bookmark feature that allows a user to bookmark a currently displayed web page by simply clicking a button on the toolbar. The button becomes highlighted, which serves as an indicator each time the web page is displayed that the current web page has been bookmarked. By clicking the same button a second time, a user is presented with a list of editing operations that can be performed on the bookmark, such as renaming the bookmark, removing the bookmark, applying or removing one or more labels for the bookmark, and creating a new label.

Whereas these editing operations typically are useful in terms of the features and functionality they offer, they typically require the user to go through several steps and possibly enter information in several windows, menus, or dialog boxes that are displayed. Thus, it would be useful to have simpler and more efficient ways for users to save, edit, and remove bookmarks.

SUMMARY

In general, in one aspect, the invention provides methods and apparatus, including computer program products, implementing and using techniques for managing bookmarks associated with web pages. A button is displayed on a graphical user interface associated with a browser displaying a web page on the computer display. A user input selecting the button is received. Each time the button is selected, an editing window is displayed, which includes several bookmark editing operations for the displayed web page. The bookmark editing operations can be completed by a user in the editing window.

Various implementations can include one or more of the following features. A user input performing one or more bookmark editing operations in the editing window can be received, and a bookmark record for the user at a remote server can be updated in response to the received user input. The graphical user interface can be a toolbar in a browser. Displaying an editing window can include displaying a semi-transparent editing window overlaying the displayed web page. Displaying a button can include displaying the button in one of: a first state that indicates that the displayed web page has not been bookmarked, a second state that indicates that a bookmark for the displayed web page is currently being edited by the user, and a third state that indicates that the displayed web page has been bookmarked.

Displaying an editing window can include displaying an editing window with a text box in which a user can enter a custom name for the displayed web page. Displaying an editing window can include displaying an editing window with one or more categories with which the displayed webpage can be associated. A checkbox can be displayed adjacent to each category in the editing window, and the checkboxes can be checked by a user to indicate an association between the displayed web page and the category adjacent to the checked checkbox. User input selecting multiple checkboxes can be received prior to closing the editing window.

Displaying an editing window can include displaying an editing window with an option for creating a new category to be added to the one or more categories. Displaying an editing window can include displaying an editing window with a user selectable option for saving a bookmark associated with the displayed web page. Displaying an editing window can include displaying an editing window having a user selectable option for discarding a bookmark associated with the displayed web page. The bookmark editing operations can be completed by a user in the editing window without opening any additional windows.

The invention can be implemented to include one or more of the following advantages. A user-friendly way of editing bookmarks is provided, where all the editing operations are performed in a single editing window. Automatically opening the editing window each time the bookmark button is clicked on the toolbar reduces the risk of accidentally adding or removing a bookmark. Providing a semi-transparent editing window lets the user see the underlying web page whose bookmark is being edited, while performing the editing operations. Having an editing mode through which the user must pass when creating a bookmark encourages users to organize their new bookmarks immediately with the proper title and labels.

The details of one or more embodiments of the invention are set forth in the accompanying drawings and the description below. Other features and advantages of the invention will be apparent from the description and drawings, and from the claims.

DETAILED DESCRIPTION

Figure 1:
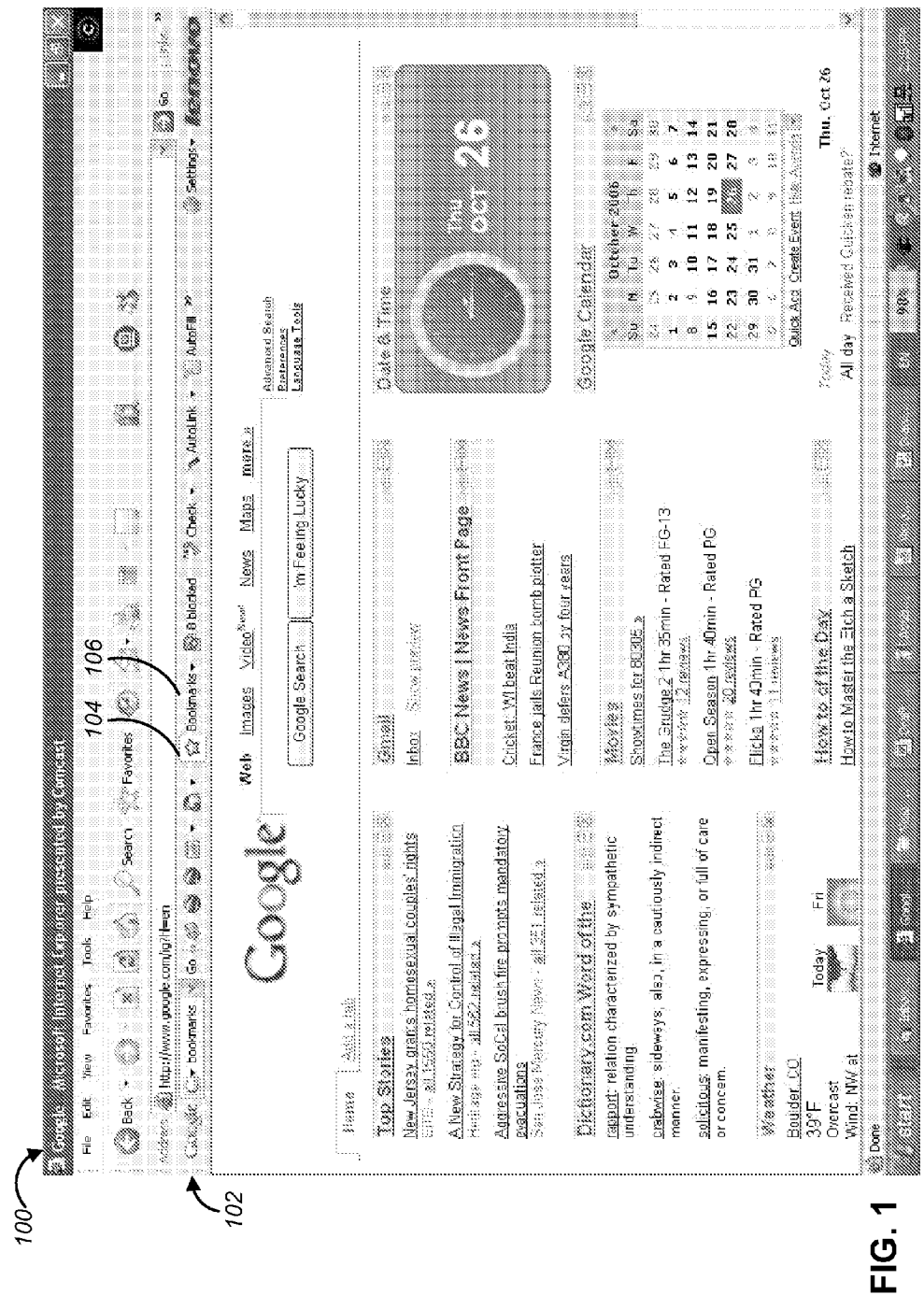
FIG. 1 shows a screenshot of a web browser with a toolbar having a bookmarking feature in accordance with one embodiment of the invention.

FIG. 1 shows a screenshot of a web browser (100) running on a user's computer. As is well known to those of ordinary skill in the art, a web browser (100) is a software application that enables a user to view and interact with text, images, and other types of information typically located on a web page at a website on the World Wide Web or a local area network. The web browser (100) allows a user to quickly and easily access information provided on many web pages at many web sites. There is a wide range of web browsers (100) available for personal computers, such as Internet Explorer, Mozilla Firefox, Safari, Netscape and Opera. Although web browsers are typically used to access the World Wide Web, they typically can also be used to access information provided by web servers in private networks or content in various types of file systems.

The web browser (100) shown in FIG. 1 also contains a toolbar (102), which provides increased functionality to the web browser (100). The toolbar (102) shown in FIG. 1 has been downloaded from Google Inc. of Mountain View, Calif. and installed in the browser, and allows quick and easy access to many services. One such service is the bookmark feature, which is shown in FIG. 1 as two distinct buttons (104; 106) that a user can click.

As will be described in further detail with reference to FIG. 2, the first, star-shaped, button (104) can display one of three different states to the user whenever a web page is loaded into the browser. The first state indicates that a currently displayed web page has not been bookmarked, the second state indicates that a bookmark for the currently displayed web page is in the process of being edited, and the third state indicates that the page has been bookmarked. As will also be described below, in various embodiments of the invention, when a user clicks this star-shaped button (104) an editing window is opened, in which the user can perform a range of bookmark-related operations.

The second button (106) labeled "Bookmarks" is a button that when clicked by a user shows a drop-down menu of existing bookmarks. That is, while the first star-shaped button (104) operates on a single bookmark related to a currently displayed web page, the second "bookmarks" button (106) shows a list of all previously stored bookmarks, for a particular user. In various embodiments of the invention, this list of bookmarks can be organized in various categories or labels, such that a bookmark for an online sports magazine, for example, can be associated with a "Sports" label and a "News" label, and thus be more easily found by the user. In some embodiments, the bookmarks that are created by the user are stored on a remote server, so that they can be accessed by the user on different computers by signing into their user account on the server, for example, using the toolbar. However, it should be noted that in some embodiments the bookmarks can also be associated with a particular user profile and stored locally on the computer, so that multiple users can use the same computer and still only access and modify their own bookmarks.

Figure 2:
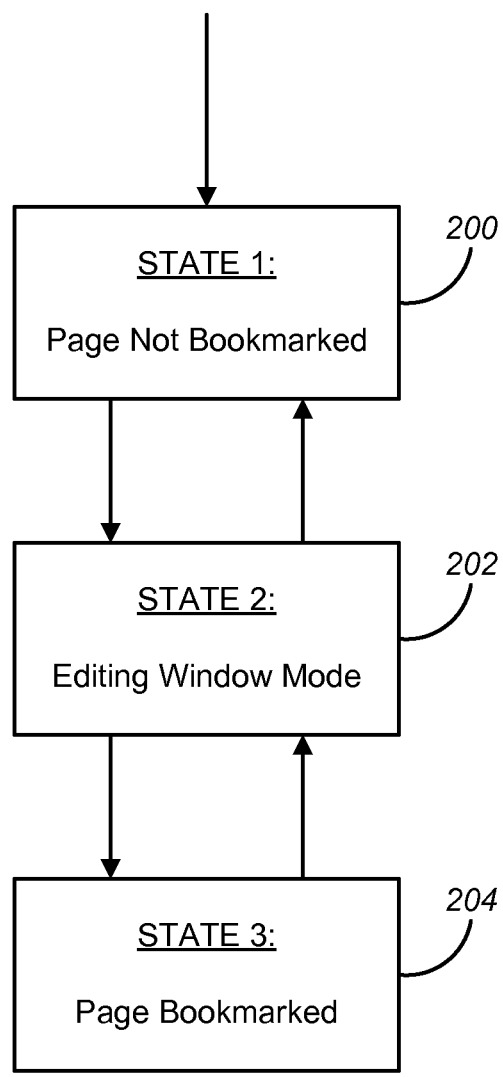
FIG. 2 shows three states of the bookmark button in FIG. 1, and the possible transitions between the states in response to a user clicking the button in accordance with one embodiment of the invention.

FIG. 2 shows three states of the star-shaped bookmark button (104) in FIG. 1, and the transitions between the states in response to a user clicking the button (104) in accordance with one embodiment of the invention. The first state (200) of the button (104) indicates that a currently displayed webpage has not been bookmarked. In various embodiments of the invention, this can be visually indicated to the user, for example, by showing a dark star on the button (104). When a user clicks the button (104), the state of the button (104) transfers to a second state (202), which indicates an editing mode in which various editing operations of a bookmark for the displayed web page can be made. In various embodiments of the invention, this can be visually indicated to the user, for example, by showing a flashing star on the button (104). An editing window is also opened as a result of the user clicking the button (104), in which the user can perform the various editing operations, as will be described in further detail below. When the user is done performing the editing operations, he can choose to save the edits, which is indicated by the button (104) transferring to a third state (204), that indicates that the page has been bookmarked. In various embodiments of the invention, this can be visually indicated to the user, for example, by showing a highlighted star on the button (104). The user can also choose not to save the edits made in the second state (202), in which case the button (104) returns to its initial state of showing that the current page has not been bookmarked. Similarly, if a user loads a previously bookmarked page, the button (104) will show up in the third state (204), and subsequently clicking on the button (104) will cause it to enter the second state (202) and the editing window will be opened.

It should be noted that in these embodiments, there is no way to go directly between the first state (200), that is, the non-bookmarked state, and the third state (204), that is, the bookmarked state, without passing through the intermediate editing state (202). This minimizes the risk of a user accidentally creating or deleting a bookmark. The possible editing operations of the second state (202) in accordance with various embodiments of the invention will now be described by way of example. It should be noted that the operations that are described below in no way form an exhaustive list of editing operations, but are merely examples of some of the functionality that is provided in accordance with the various embodiments of the invention.

Figure 3:
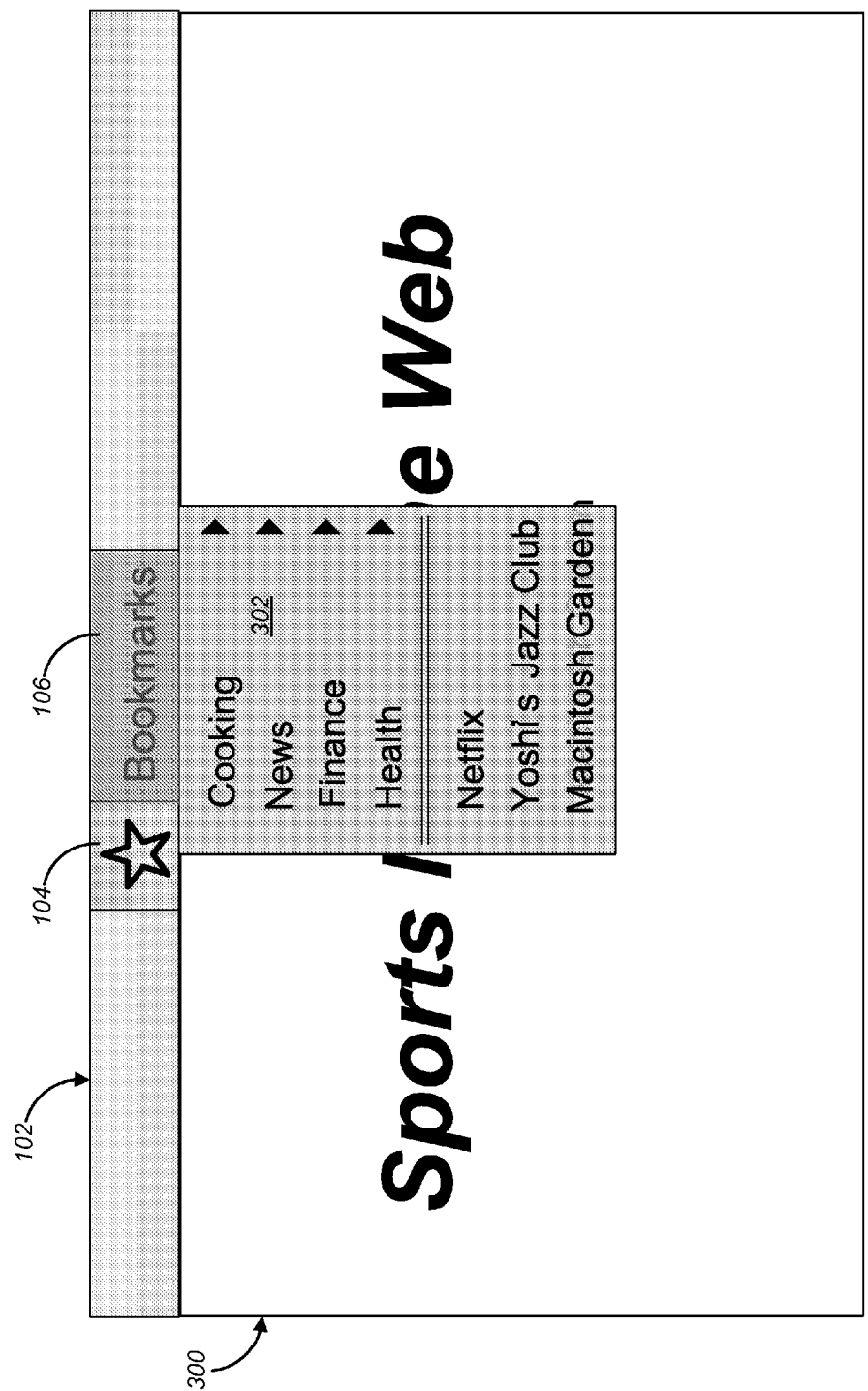
FIG. 3 shows a detailed view of a web page and a toolbar with a bookmark feature in accordance with one embodiment of the invention.

FIG. 3 shows a detailed view of a Sports Magazine web page (300) and a toolbar (102) having bookmark buttons (104; 106) in accordance with one embodiment of the invention. As can be seen in FIG. 3, the star button (104) is in the first state, that is, the Sports Magazine web page (300) has not yet been bookmarked by the user. FIG. 3 also shows that the second "bookmarks" button (106) has been clicked, and as a result a drop down menu (302) is displayed. The drop-down menu (302) lists four labels that the user has created (Cooking, News, Finance, and Health, respectively), under which one or more bookmarks are categorized, as indicated by the arrows on the right hand side of the drop-down menu. Below the labels, there are also three bookmarks which are currently not associated with any labels (Netflix, Yoshi's Jazz Club, and Macintosh Garden, respectively).

Figure 4:
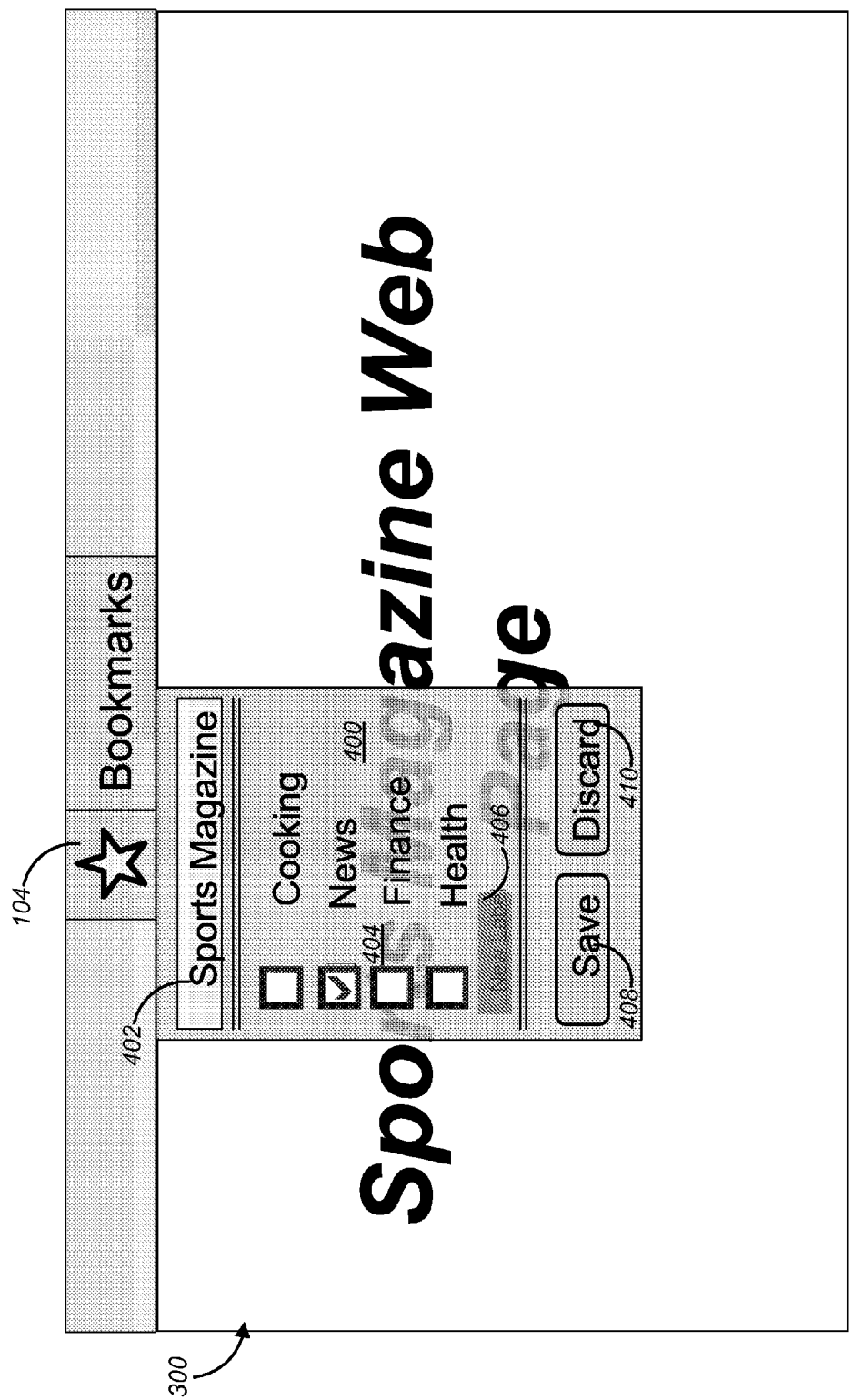
FIG. 4 shows a detailed view of the web page and toolbar in FIG. 3, with an editing window that is opened in response to a user clicking the bookmark button in accordance with one embodiment of the invention.

The user decides to create a bookmark for the Sports Magazine web page and clicks the star button (104), which causes the button to enter the second state and opens an editing window (400), as shown in FIG. 4. In the editing window (400) there is a name field (402) that shows a default name "Sports Magazine" of the current web page. In some embodiments, the user can change this default name to a different name of their choice that makes it easier to remember what page the bookmark refers to when the bookmark is recalled at a later point. The editing window (400) also contains a number of labels (404), under which the user can classify the current web page. The labels shown in FIG. 4 describe the categories "Cooking," "News," "Finance," and "Health." The bookmark can be associated with one or more of the labels by checking the respective adjacent check boxes. In some embodiments, the toolbar can have one or more pre-defined labels and in other embodiments the labels can be entirely defined by the user. Shown in FIG. 4 is also a "New Label" button (406) option that a user can click in order to create a new label to be added to the already existing labels (404).

As can be seen in FIG. 4, the user has decided to label the bookmark for the "Sports Magazine" webpage with the "News" label. The user has also decided to add a new label for the bookmark and clicked the "New Label" option (406), which causes this option to be temporarily highlighted to indicate the selection. Finally, the editing window (400) also contains a "Save" button (408) for saving the current bookmark, and a "Discard" button (410) for discarding the current bookmark. None of these buttons have been selected in FIG. 4.

Figure 5:
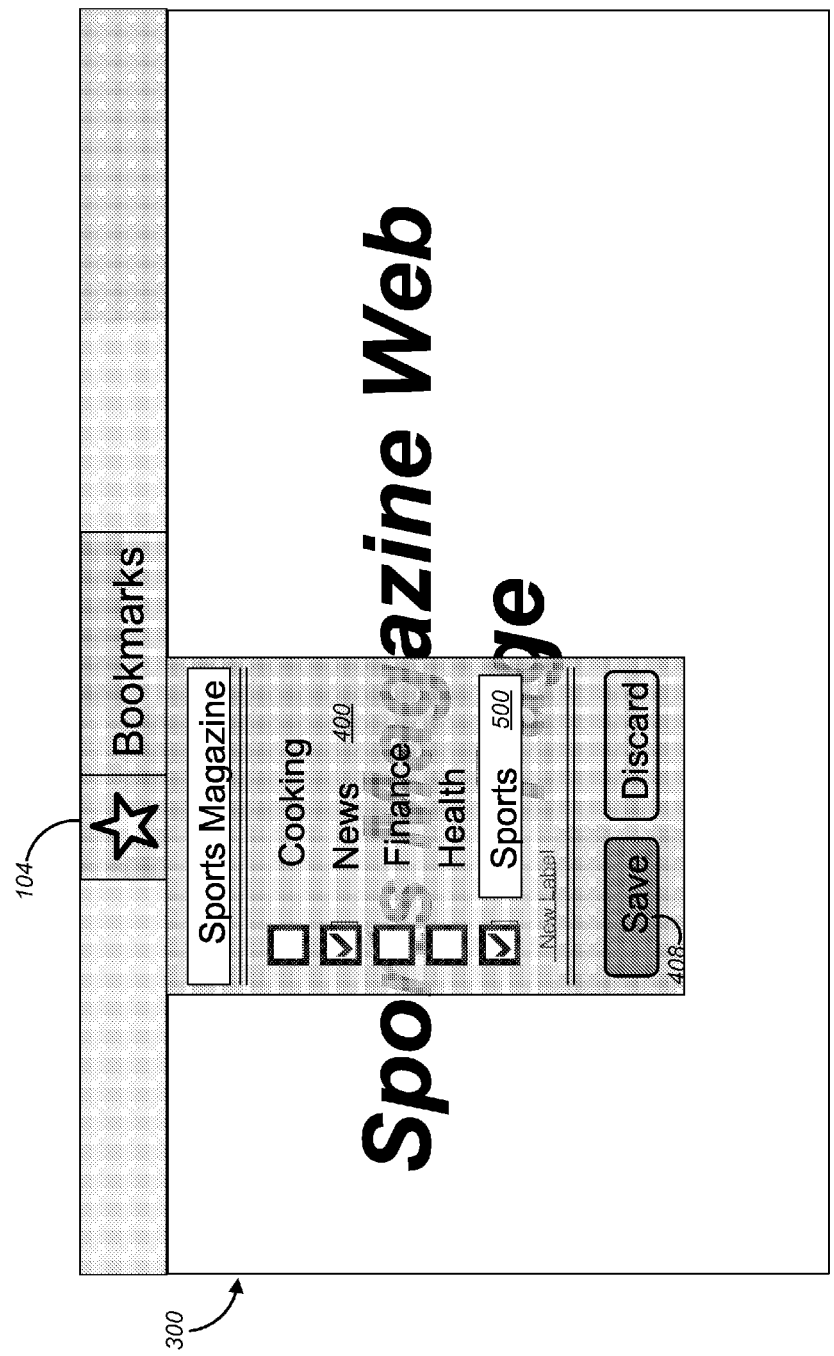
FIG. 5 shows a detailed view of the web page and toolbar in FIG. 3, and how a user adds a new label in accordance with one embodiment of the invention.

Referring now to FIG. 5, as a result of clicking the "New label" option (406), the editing window (400) changes appearance and adds a new label (500) to the list of existing labels (404). The new label (500) is given a name, "Sports," by the user and is automatically selected. It should, however, be realized that there are also embodiments in which the new label is not pre-selected and the user must select the label by clicking the adjacent checkbox, just like the existing labels are selected by the user. There are also embodiments in which a list of suggested labels can be presented to a user when the user clicks the "New label" options (406), such as a drop-down list of names suggested by the bookmarking feature depending on an analysis of the contents of the currently displayed webpage. After giving the new label (500) a name, the user clicks the "Save" button (408) to save the bookmark under the selected labels, which is indicated by the "Save" button (408) being highlighted.

Figure 6:
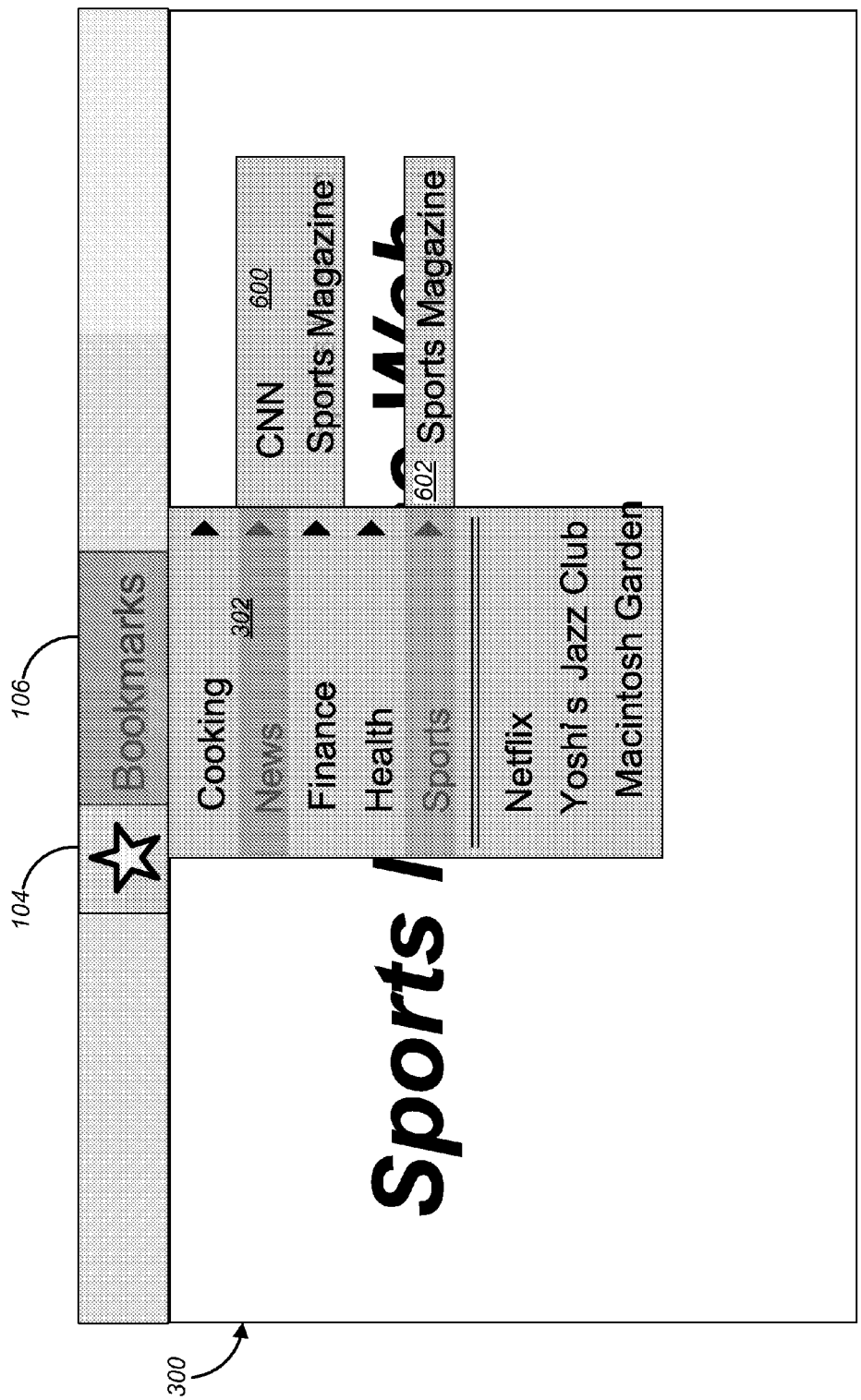
FIG. 6 shows a detailed view of the web page and toolbar in FIG. 3, with a new label added as shown in FIG. 5, in accordance with one embodiment of the invention.
Figure 7:
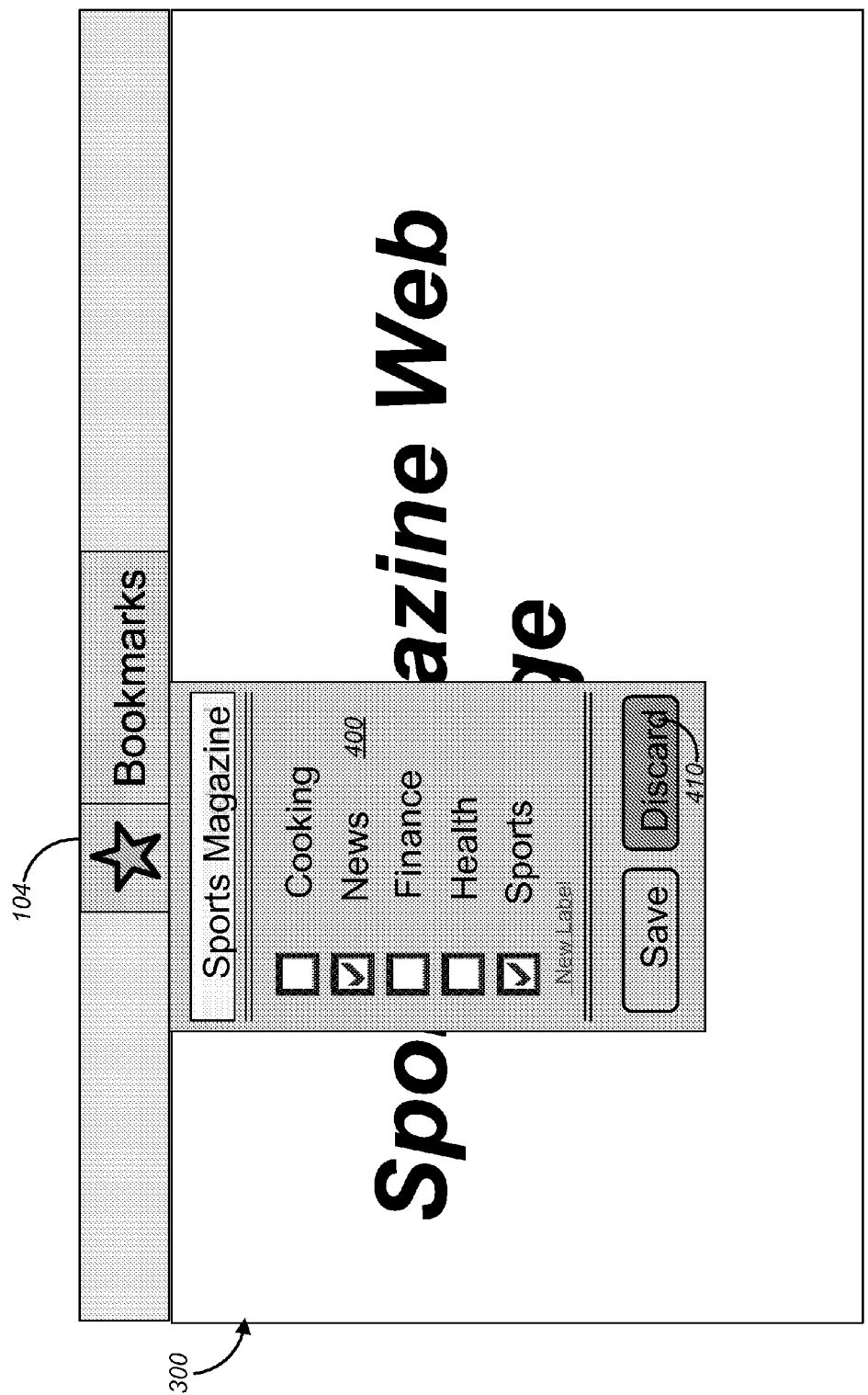
FIG. 7 shows a detailed view of the web page and toolbar in FIG. 3, and how a user removes a bookmark in accordance with one embodiment of the invention Like reference symbols in the various drawings indicate like elements.

FIG. 6 shows an example of the display the next time the user clicks the Bookmarks button (106). The drop-down menu (302) appears with the same labels as before, and now also includes the "Sports" label created by the user as explained above. As can also be seen in FIG. 6, when the user selects the "News" label, a submenu (600) is opened, which includes the bookmark for the "Sports Magazine" webpage. The bookmark for the "Sports Magazine" webpage is also included in a submenu (602) that appears when the "Sports" label is clicked. Thus, by having the bookmark for the "Sports Magazine" webpage categorized both under the "News" label and under the "Sports" label, it is easier for a user to find the bookmark when looking for it at a later point in time, compared to what it would be, were the bookmark only included in a single folder as is typically the case in existing browsers.

If the user at a later point in time decides to remove the bookmark, she can open up the webpage, for example, by using the existing bookmark or typing in the address of the webpage in the browser. When the webpage comes up in the browser, the user clicks the star button (104) as shown in FIG. 4, which opens the editing window (400), as described above. In the editing window, the user simply clicks the "Discard" button (410), which causes the bookmark to be removed and the star button (104) to return to its original non-highlighted state.

The invention can be implemented in digital electronic circuitry, or in computer hardware, firmware, software, or in combinations of them. Apparatus of the invention can be implemented in a computer program product tangibly embodied in a machine-readable medium for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Machine-readable media suitable for tangibly embodying computer program instructions and data include all forms of memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the indications of a dark, flashing, or highlighted star button can be done alternatively by changing the color of the star, in a red, yellow, green scheme that indicates no bookmark, editing, and bookmarked, respectively. Various symbols can also be shown on the button to indicate the bookmark status for a currently displayed web page. The editing window has been shown above as a semi-transparent window, but of course it can also be opaque or fully transparent. The operations described above have been described in the context of a toolbar, but can of course also be built-in functions in a web browser. The bookmarking operations have been described by way of example of a button in a graphical user interface, but it should be clear that other types of graphical user interface elements can also be used, or that the bookmarking operations can be achieved through selecting operations in a menu. Accordingly, other embodiments are within the scope of the following claims.

The invention claimed is:

1. A computer-implemented method for managing bookmarks associated with web pages, comprising:
   providing an interface element on a graphical user interface associated with a browser currently displaying a web page on a computer display, the interface element being operable to be displayed in three different states, wherein each state indicates a bookmarking status of the currently displayed web page;
   displaying the interface element in a non-bookmarked state if the currently displayed web page has not been bookmarked;
   displaying the interface element in a bookmarked state if the currently displayed web page has been bookmarked;
   receiving a user input selecting the interface element; and
   each time the interface element is selected, displaying an editing window including a plurality of bookmark editing operations for the currently displayed web page, and a plurality of bookmark categories with respect to which the bookmark editing operations can be completed by a user in the editing window, and changing the display of the interface element to an intermediate editing state while a bookmark for the currently displayed web page is being edited by the user,
   wherein the interface element is operable to transition only between being displayed in the non-bookmarked state and being displayed in the intermediate editing state and between being displayed in the intermediate editing state and being displayed in the bookmarked state.

2. The method of claim 1, further comprising:
   receiving user input performing one or more bookmark editing operations in the editing window; and
   updating a bookmark record for the user at a remote server in response to the received user input.

3. The method of claim 1, wherein the graphical user interface is a toolbar in a browser.

4. The method of claim 1, wherein displaying an editing window includes displaying a semi-transparent editing window overlaying the currently displayed web page.

5. The method of claim 1, wherein displaying an editing window includes displaying an editing window with a text box in which a user can enter a custom name for the currently displayed web page.

6. The method of claim 1, wherein displaying an editing window includes displaying an editing window with one or more categories with which the currently displayed webpage can be associated.

7. The method of claim 6, further comprising displaying a checkbox adjacent to each category in the editing window, the checkboxes being operable to be checked by a user to indicate an association between the currently displayed web page and the category adjacent to the checked checkbox.

8. The method of claim 7, further comprising receiving user input selecting multiple checkboxes prior to closing the editing window.

9. The method of claim 6, wherein displaying an editing window includes displaying an editing window with an option for creating a new category to be added to the one or more categories.

10. The method of claim 1, wherein displaying an editing window includes displaying an editing window with a user selectable option for saving a bookmark associated with the currently displayed web page.

11. The method of claim 1, wherein displaying an editing window includes displaying an editing window having a user selectable option for discarding a bookmark associated with the currently displayed web page.

12. The method of claim 1, wherein the bookmark editing operations can be completed by a user in the editing window without opening any additional windows.

13. The method of claim 1, wherein the interface element is a button on the graphical user interface.

14. The method of claim 1, wherein the user interface element is a menu item on the graphical user interface.

15. A computer program product, stored on a machine-readable medium, for managing bookmarks associated with web pages, comprising instructions operable to cause a computer to:
provide an interface element on a graphical user interface associated with a browser currently displaying a web page on a computer display, the interface element being operable to be displayed in three different states, wherein each state indicates a bookmarking status of the currently displayed web page;
display the interface element in a non-bookmarked state if the currently displayed web page has not been bookmarked;
display the interface element in a bookmarked state if the currently displayed web page has been bookmarked;
receive a user input selecting the interface element; and
each time the interface element is selected, display an editing window including a plurality of bookmark editing operations for the currently displayed web page, and a plurality of bookmark categories with respect to which the bookmark editing operations can be completed by a user in the editing window, and change the display of the interface element to an intermediate editing state while a bookmark for the currently displayed web page is being edited by the user,
wherein the interface element is operable to transition only between being displayed in the non-bookmarked state and being displayed in the intermediate editing state and between being displayed in the intermediate editing state and being displayed in the bookmarked state.

16. The computer program product of claim 15, further comprising instructions to:
receive user input performing one or more bookmark editing operations in the editing window; and
update a bookmark record for the user at a remote server in response to the received user input.

17. The computer program product of claim 15, wherein the graphical user interface is a toolbar in a browser.

18. The computer program product of claim 15, wherein the instructions to display an editing window include instructions to display a semi-transparent editing window overlaying the currently displayed web page.

19. The computer program product of claim 15, wherein the instructions to display an editing window include instructions to display an editing window with a text box in which a user can enter a custom name for the currently displayed web page.

20. The computer program product of claim 15, wherein the instructions to display an editing window include instructions to display an editing window with one or more categories with which the currently displayed webpage can be associated.

21. The computer program product of claim 20, further comprising instructions to display a checkbox adjacent to each category in the editing window, the checkboxes being operable to be checked by a user to indicate an association between the currently displayed web page and the category adjacent to the checked checkbox.

22. The computer program product of claim 21, further comprising instructions to receive user input selecting multiple checkboxes prior to closing the editing window.

23. The computer program product of claim 20, wherein the instructions to display an editing window include instructions to display an editing window with an option for creating a new category to be added to the one or more categories.

24. The computer program product of claim 15, wherein the instructions to display an editing window include instructions to display an editing window with a user selectable option for saving a bookmark associated with the currently displayed web page.

25. The computer program product of claim 15, wherein the instructions to display an editing window include instructions to display an editing window having a user selectable option for discarding a bookmark associated with the currently displayed web page.

26. The computer program product of claim 15, wherein the bookmark editing operations can be completed by a user in the editing window without opening any additional windows.

27. The computer program product of claim 15, wherein the interface element is a button on the graphical user interface.

28. The computer program product of claim 15, wherein the user interface element is a menu item on the graphical user interface.

29. An apparatus for managing bookmarks associated with web pages, comprising:
a computer memory storing instructions executable by a computer processor;
a computer display operatively coupled to the computer memory and the computer processor;
a computer processor, operable to perform the following operations upon execution of the instructions in the computer memory:
providing an interface element on a graphical user interface associated with a browser currently displaying a web page on the computer display, the interface element being operable to be displayed in three different states, wherein each state indicates a bookmarking status of the currently displayed web page;
displaying the interface element in a non-bookmarked state if the currently displayed web page has not been bookmarked;
displaying the interface element in a bookmarked state if the currently displayed web page has been bookmarked;
receiving a user input selecting the interface element; and
displaying an editing window including a plurality of bookmark editing operations for the displayed web page and a plurality of bookmark categories with respect to which the bookmark editing operations can be completed by a user in the editing window each time the interface element is selected, and changing the display of the interface element to an intermediate editing state while a bookmark for the currently displayed web page is being edited by the user,
wherein the interface element is operable to transition only between being displayed in the non-bookmarked state and being displayed in the intermediate editing state and between being displayed in the intermediate editing state and being displayed in the bookmarked state.

30. The apparatus of claim 29, wherein the computer processor is further operable to perform the following operations:
    receiving user input performing one or more bookmark editing operations in the editing window; and
    updating a bookmark record for the user at a remote server in response to the received user input.

31. The apparatus of claim 29, wherein the computer processor is further operable to perform the following operations:
    displaying a checkbox adjacent to each category in the editing window, the checkboxes being operable to be checked by a user to indicate an association between the currently displayed web page and the category adjacent to the checked checkbox.

32. The apparatus of claim 29, wherein the interface element is a button on the graphical user interface.

33. The apparatus of claim 29, wherein the user interface element is a menu item on the graphical user interface.

\* \* \* \* \*